United States Patent
Sano et al.

(10) Patent No.: US 10,312,523 B2
(45) Date of Patent: Jun. 4, 2019

(54) LITHIUM ION SECONDARY BATTERY

(71) Applicant: TDK Corporation, Tokyo (JP)

(72) Inventors: Atsushi Sano, Tokyo (JP); Keitaro Otsuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/437,978

(22) Filed: Feb. 21, 2017

(65) Prior Publication Data

US 2017/0250408 A1   Aug. 31, 2017

(30) Foreign Application Priority Data

Feb. 25, 2016 (JP) .................................. 2016-034157
Dec. 26, 2016 (JP) .................................. 2016-250325

(51) Int. Cl.

| | |
|---|---|
| *H01M 4/62* | (2006.01) |
| *H01M 4/525* | (2010.01) |
| *H01M 4/58* | (2010.01) |
| *H01M 4/505* | (2010.01) |
| *H01M 4/36* | (2006.01) |
| *H01M 10/0525* | (2010.01) |
| *H01M 10/0569* | (2010.01) |
| *H01M 4/131* | (2010.01) |
| *H01M 4/13* | (2010.01) |
| *H01M 4/38* | (2006.01) |

(52) U.S. Cl.
CPC ............. *H01M 4/628* (2013.01); *H01M 4/13* (2013.01); *H01M 4/131* (2013.01); *H01M 4/364* (2013.01); *H01M 4/505* (2013.01); *H01M 4/525* (2013.01); *H01M 4/5825* (2013.01); *H01M 10/0525* (2013.01); *H01M 10/0569* (2013.01); *H01M 4/386* (2013.01)

(58) Field of Classification Search
CPC ...... H01M 4/131; H01M 4/364; H01M 4/505; H01M 4/525
See application file for complete search history.

(56) References Cited

U.S. PATENT DOCUMENTS

| | | | | |
|---|---|---|---|---|
| 2007/0196727 | A1* | 8/2007 | Wang | ................ H01M 10/0525 429/105 |
| 2008/0241693 | A1* | 10/2008 | Fukuchi | ............... C01G 45/006 429/231.1 |
| 2013/0260226 | A1 | 10/2013 | Sano et al. | |
| 2013/0260228 | A1 | 10/2013 | Sano et al. | |
| 2015/0263337 | A1* | 9/2015 | Naoi | .................... H01M 4/364 429/231.1 |

FOREIGN PATENT DOCUMENTS

| | | | |
|---|---|---|---|
| JP | 2003-068304 | A | 3/2003 |
| JP | 2009-231206 | A | 10/2009 |
| JP | 4382193 | B2 * | 12/2009 |
| JP | 2013-229303 | A | 11/2013 |
| JP | 2013-229304 | A | 11/2013 |

* cited by examiner

*Primary Examiner* — Ladan Mohaddes
(74) *Attorney, Agent, or Firm* — Oliff PLC

(57) ABSTRACT

A lithium ion secondary battery includes: a positive electrode including a positive electrode active material layer; a negative electrode; and an electrolyte. The positive electrode active material layer contains $Li_a(M)_b(PO_4)_c$ (M=VO or V, $0.9 \leq a \leq 3.3$, $0.9 \leq b \leq 2.2$, $0.9 \leq c \leq 3.3$) as a first positive electrode active material, and additionally contains a fluorine compound of 1 to 300 ppm in terms of fluorine with respect to a weight of the positive electrode active material layer.

7 Claims, 1 Drawing Sheet

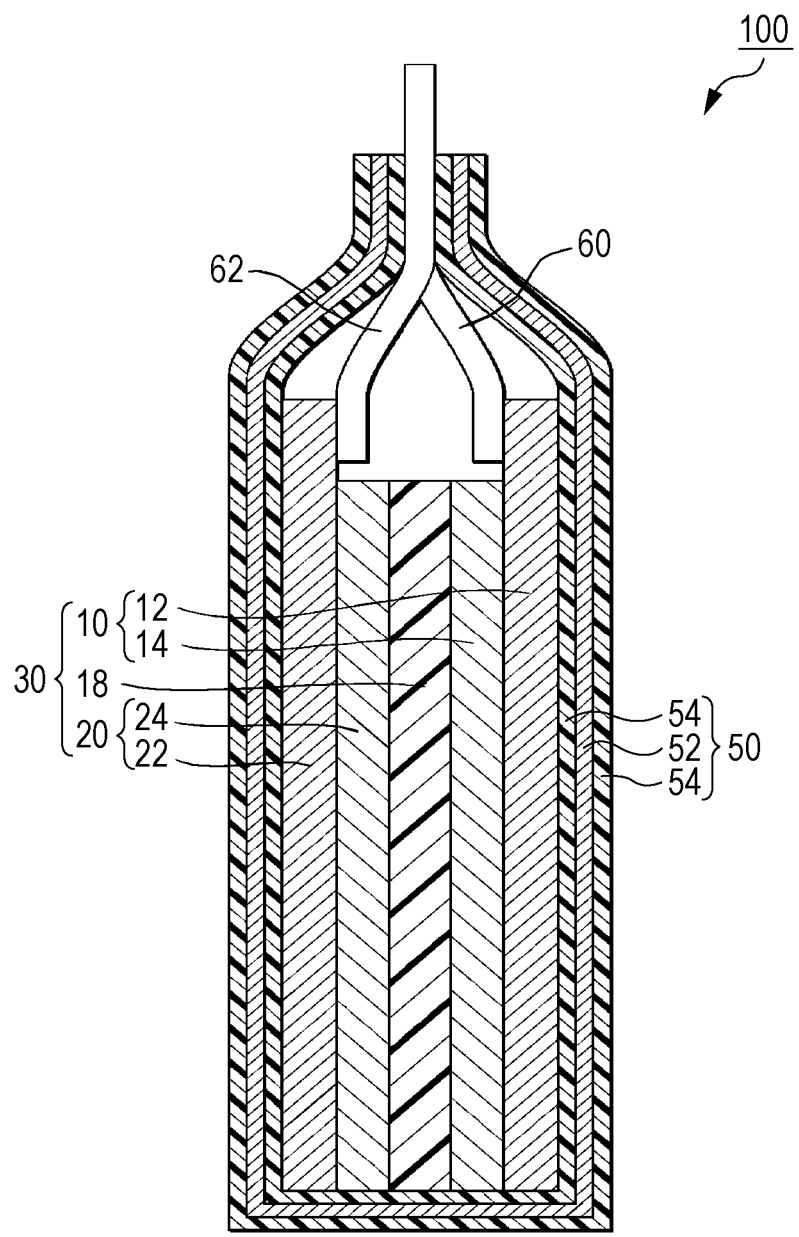

LITHIUM ION SECONDARY BATTERY

CROSS-REFERENCE TO RELATED APPLICATION

This application claims priority from Japanese Patent Application Nos. 2016-034157 filed on Feb. 25, 2016 and 2016-250325 on Dec. 26, 2016, with the Japan Patent Office the entire contents of which are hereby incorporated by reference.

BACKGROUND

1. Technical Field

The present disclosure relates to a lithium ion secondary battery.

2. Description of the Related Art

Typically, as the positive electrode material (positive electrode active material) for lithium ion secondary batteries, laminated compounds such as $LiCoO_2$ and $LiNi_{1/3}Mn_{1/3}Co_{1/3}O_2$, and spinel compounds such as $LiMn_2O_4$ have been used. Recently, attentions are being focused on compounds having an olivine-type structure, such as represented by $LiFePO_4$. Positive electrode materials having olivine structures are known to have high thermal stability at elevated temperature and high safety levels. However, a lithium ion secondary battery using $LiFePO_4$ has low charging/discharging voltages of approximately 3.5 V, with an associated disadvantage of low energy density. To address this, $LiCoPO_4$ and $LiNiPO_4$ and the like have been proposed as phosphate-based positive electrode materials with which high charging/discharging voltages can be achieved.

However, even with the lithium ion secondary battery using such positive electrode materials, sufficient capacity has not been obtained. Among the phosphate-based positive electrode materials, vanadium phosphate with structures of $LiVOPO_4$ and $Li_3V_2(PO_4)_3$ is known as a compound capable of achieving charging/discharging voltages on the order of 4 V. When the compounds are used as the positive electrode active material, there has been the problem of insufficient rapid charging characteristics at low temperatures. With regard to the positive electrode material, vanadium phosphate is described in JP-A-2003-68304 and JP-A-2009-231206. The literature, however, fails to describe the problem of rapid charging at low temperatures.

SUMMARY

A lithium ion secondary battery includes: a positive electrode including a positive electrode active material layer; a negative electrode; and an electrolyte. The positive electrode active material layer contains $Li_a(M)_b(PO_4)_c$ (M=VO or V, $0.9 \leq a \leq 3.3$, $0.9 \leq b \leq 2.2$, $0.9 \leq c \leq 3.3$) as a first positive electrode active material, and additionally contains a fluorine compound of 1 to 300 ppm in terms of fluorine with respect to a weight of the positive electrode active material layer.

BRIEF DESCRIPTION OF THE DRAWINGS

FIG. 1 is a schematic cross sectional view of the lithium ion secondary battery according to the present embodiment.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a lithium ion secondary battery suitable for rapid charging at low temperatures.

A lithium ion secondary battery according to one aspect of the present disclosure (the present lithium ion secondary battery) includes: a positive electrode including a positive electrode active material layer; a negative electrode; and an electrolyte. The positive electrode active material layer contains $Li_a(M)_b(PO_4)_c$ (M=VO or V, $0.9 \leq a \leq 3.3$, $0.9 \leq b \leq 2.2$, $0.9 \leq c \leq 3.3$) as a first positive electrode active material, and additionally contains a fluorine compound of 1 to 300 ppm in terms of fluorine with respect to a weight of the positive electrode active material layer.

The present lithium ion secondary battery with the above-described configuration is suitable for rapid charging at low temperatures. This is believed to be because the fluorine compound reduces decomposition of the first positive electrode active material and the electrolyte, and reduces an increase in film formation at the interface.

In the present lithium ion secondary battery, the fluorine compound may be lithium fluoride.

When the fluorine compound is lithium fluoride, it is speculated that the lithium fluoride specifically interacts with the first positive electrode active material, reduces electrolyte decomposition, and reduces an increase in film formed at the interface.

In the present lithium ion secondary battery, the fluorine compound may be present in a region from a surface to a depth of 100 nm of the positive electrode active material layer.

It is speculated that, when the fluorine compound on the surface of the positive electrode active material layer is present in the region from the surface to a depth of 100 nm of the positive electrode active material layer, electrolyte decomposition is reduced and an increase in the film formed at the interface is reduced more effectively.

In addition, the first positive electrode active material may contain $LiVOPO_4$ or $Li_3V_2(PO_4)_3$. It is speculated that in this way, the fluorine compound specifically interacts with the first positive electrode active material, reduces electrolyte decomposition, and reduces an increase in film formed at the interface.

The positive electrode active material layer may additionally contain $LiNi_xCo_yMn_zM_aO_2$ (x+y+z+a=1, $0 \leq x \leq 1$, $0 \leq y \leq 1$, $0 \leq z \leq 1$, and $0 \leq a \leq 1$, where M is one or more elements selected from Al, Mg, Nb, Ti, Cu, Zn, and Cr) as a second positive electrode active material.

The positive electrode active material layer may contain 1 to 30 wt % of the first positive electrode active material with respect to the sum of the first positive electrode active material and the second positive electrode active material.

The lithium ion secondary battery may contain 4-fluoro-ethylene carbonate as the electrolyte.

It is speculated that, when 4-fluoroethylene carbonate is included, the fluorine compound on the surface of $Li_a(M)_b(PO_4)_c$ (M=VO or V, $0.9 \leq a \leq 3.3$, $0.9 \leq b \leq 2.2$, and $0.9 \leq c \leq 3.3$) is stabilized, the interaction of the first positive electrode active material and the fluorine compound is promoted, and an increase in the film formed at the interface is reduced.

The negative electrode may contain at least one or more selected from silicon and silicon oxide as the negative electrode active material.

When at least one or more selected from silicon and silicon oxide is included in the negative electrode active material, more satisfactory rapid charging at low temperatures can be performed.

According to the present disclosure, a lithium ion secondary battery suitable for rapid charging at low temperatures can be provided.

In the following, preferred embodiments of the present disclosure will be described with reference to the drawings. The technology of the present disclosure is not limited to the following embodiments. The constituent elements described below may include those that would readily occur to those skilled in the art, and those substantially identical to the constituent elements. In addition, the constituent elements described below may be combined as appropriate.

(Lithium Ion Secondary Battery)

As illustrated in FIG. 1, a lithium ion secondary battery 100 according to the present embodiment is provided with a power generating element 30; an electrolyte solution including lithium ions; a case 50 that encases the above elements in a sealed state; a negative electrode lead 62; and a positive electrode lead 60. The power generating element 30 is provided with a planar negative electrode 20 and a planar positive electrode 10 that are disposed opposing each other; and a planar separator 18 disposed between and adjacent to the negative electrode 20 and the positive electrode 10. One end of the negative electrode lead 62 is electrically connected to the negative electrode 20. The other end of the negative electrode lead 62 protrudes outside the case. One end of the positive electrode lead 60 is electrically connected to the positive electrode 10. The other end of the positive electrode lead 60 protrudes outside the case.

The negative electrode 20 includes a negative electrode current collector 22 and a negative electrode active material layer 24 stacked on the negative electrode current collector 22. The positive electrode 10 includes a positive electrode current collector 12 and a positive electrode active material layer 14 stacked on the positive electrode current collector 12. The separator 18 is positioned between the negative electrode active material layer 24 and the positive electrode active material layer 14.

First Embodiment (Positive Electrode Active Material Layer)

The positive electrode active material layer 14 in the positive electrode 10 used in the lithium ion secondary battery 100 of the present embodiment contains $Li_a(M)_b(PO_4)_c$ (M=VO or V, $0.9 \leq a \leq 3.3$, $0.9 \leq b \leq 2.2$, $0.9 \leq c \leq 3.3$) as the first positive electrode active material, and additionally contains a fluorine compound. The content of the fluorine compound is 1 to 300 ppm in terms of fluorine with respect to the weight of the positive electrode active material layer 14.

In the present embodiment, the positive electrode active material layer 14 of the lithium ion secondary battery 100 contains 1 to 300 ppm of the fluorine compound in terms of fluorine with respect to the weight of the positive electrode active material layer 14. The content of the fluorine compound may be in a range of 10 to 250 ppm in terms of fluorine with respect to the weight of the positive electrode active material layer 14, or may be in a range of 15 to 200 ppm in terms of fluorine with respect to the weight of the positive electrode active material layer 14.

Examples of the method for having the fluorine compound contained in the positive electrode active material layer 14 include a method whereby the fluorine compound is mixed in raw material during synthesis of the first positive electrode active material, and a method whereby the fluorine compound is caused to become adsorbed on the surface of the first positive electrode active material after synthesis by wet method, dry method, gas-phase method or the like.

It is known that $Li_a(M)_b(PO_4)_c$ (M=VO or V, $0.9 \leq a \leq 3.3$, $0.9 \leq b \leq 2.2$, $0.9 \leq c \leq 3.3$), which is a vanadium phosphate serving as the first positive electrode active material, can be synthesized by solid-phase synthesis, hydrothermal synthesis, carbothermal reduction method and the like. Among others, a vanadium phosphate fabricated by hydrothermal synthesis method has a small particle diameter, and tends to provide excellent rate performance. The vanadium phosphate fabricated by hydrothermal synthesis method is preferable as the first positive electrode active material. This is believed to be because the factors of the vanadium phosphate synthesized by the hydrothermal synthesis method in terms of particle diameter, crystal shape, crystallinity and the like are suitable for increasing rate performance.

Examples of the fluorine compound included in the positive electrode active material layer 14 include lithium fluoride, phosphorus fluoride, lithium fluorophosphate, vanadium fluorophosphate, and lithium vanadium fluorophosphates. In particular, the fluorine compound is preferably present in the form of lithium fluoride. This is believed to be because lithium fluoride effectively reduces electrolyte decomposition, and reduces an increase in film formed at the interface.

The fluorine compound included in the positive electrode active material layer 14 may be present near the surface of the positive electrode active material layer 14, or may be present in a region from the surface to the depth of 100 nm. In addition, the fluorine compound may be present in a region from the surface to the depth of 80 nm of the positive electrode active material layer 14, or may be present in a region from the surface to the depth of 70 nm. It is speculated that when the fluorine compound is present in such ranges (regions), electrolyte decomposition is reduced, and an increase in the film formed at the interface is reduced. The form in which the fluorine compound is present is not particularly limited. For example, the fluorine compound may in the shape of a uniform film or a non-uniform island.

(Detection of Fluorine Compound in Depth Direction)

The fluorine compound included in the positive electrode active material layer 14 can be measured using an existing analysis method, such as represented by X-ray photoelectron spectroscopy (XPS). By performing elemental analysis from the surface of the positive electrode active material layer 14 in the depth direction, the presence or absence of fluorine compound can be measured.

(Measurement of Fluorine Content)

The content of fluorine included in the positive electrode active material layer 14 can be measured using ion chromatography. In this case, the binder component may be removed in advance from the positive electrode active material layer 14 using solvent, such as an acid. In this way, it becomes possible to measure the content of the fluorine (first content) that derives from the fluorine compound of interest in the active material from which the binder component has been removed. Thereafter, by combining the weight of the removed binder component, the first content can be converted into the content of fluorine included in the positive electrode active material layer 14.

The mechanism by which the lithium ion secondary battery 100 according to the present embodiment can be rapidly charged at low temperature is believed to be as follows. On the surface of $Li_a(M)_b(PO_4)_c$ (M=VO or V, $0.9 \leq a \leq 3.3$, $0.9 \leq b \leq 2.2$, $0.9 \leq c \leq 3.3$), lithium fluoride is present. The lithium fluoride reduces decomposition of $Li_a(M)_b(PO_4)$, and the electrolyte, and reduces an increase in film formed at the interface. In the present embodiment, when the first positive electrode active material contains $LiVOPO_4$ or $Li_3V_2(PO_4)_3$, the rapid charging effect at low temperatures is particularly pronounced.

Second Embodiment

In the lithium ion secondary battery 100 according to the present embodiment, the positive electrode active material layer 14 may contain a first positive electrode active material, a fluorine compound, and a second positive electrode active material. The first positive electrode active material is $Li_a(M)_b(PO_4)_c$ (M=VO or V, $0.9 \leq a \leq 3.3$, $0.9 \leq b \leq 2.2$, $0.9 \leq c \leq 3.3$). The second positive electrode active material may be a positive electrode active material as typically used.

Examples of the second positive electrode active material include lithium-containing compounds, such as a lithium oxide, a lithium sulfide, and an intercalation compound including lithium, of which two or more may be used in a mixture.

In particular, from the viewpoint of energy density, the second positive electrode active material may be a lithium complex oxide represented by a general formula $Li_xMO_2$, or an intercalation compound including lithium. In the general formula, M may be one or more transition metals, and may specifically be at least one of Co, Ni, Mn, Fe, V, and Ti; and x varies depending on the charging/discharging state of the battery, and is normally a value in a range of $0.05 \leq x \leq 1.10$.

Other examples of the second positive electrode active material include manganese spinel having a spinel-type crystal structure ($LiMn_2O_4$), and lithium iron phosphate ($LiFePO_4$) having an olivine-type crystal structure.

Specific examples of the second positive electrode active material include lithium cobaltate ($LiCoO_2$); lithium nickelate ($LiNiO_2$); $LiNi_xCo_yMn_zM_aO_2$ ($x+y+z+a=1$, $0 \leq x \leq 1$, $0 \leq y \leq 1$, $0 \leq z \leq 1$, and $0 \leq a \leq 1$, where M is one or more elements selected from Al, Mg, Nb, Ti, Cu, Zn, and Cr); an olivine-type $LiMPO_4$ (where M is one or more elements selected from Co, Ni, Mn, Fe, Mg, Nb, Ti, Al, and Zr); and $LiNi_xCo_yAl_zO_2$ ($0.9 \leq x+y+z \leq 1.1$). The second positive electrode active material is not limited to the above materials. The second positive electrode active material is simply required to be a positive electrode active material capable of electrochemically intercalating and deintercalating lithium ions.

Among others, from the viewpoint of being able to obtain high energy density, the second positive electrode active material may be a lithium complex oxide, such as $LiNi_{0.33}Co_{0.33}Mn_{0.33}O_2$, $LiNi_{0.5}Mn_{0.2}Co_{0.3}O_2$, or $LiNi_{0.85}Co_{0.10}Al_{0.05}O_2$.

In the positive electrode active material layer 14 according to the present embodiment, the content of the first positive electrode active material with respect to the sum of the first positive electrode active material and the second positive electrode active material may be 1 to 30 wt %. The content may be 3 to 21 wt %, or may be 5 to 16 wt %.

It is believed that, when the content of the first positive electrode active material with respect to the sum of the first positive electrode active material and the second positive electrode active material is in the above ranges, the following effect can be sufficiently obtained. That is, the high energy density of the second positive electrode active material is not reduced. In addition, the presence of lithium fluoride on the surface of $Li_a(M)_b(PO_4)_c$ (M=VO or V, $0.9 \leq a \leq 3.3$, $0.9 \leq b \leq 2.2$, $0.9 \leq c \leq 3.3$) serving as the first positive electrode active material reduces decomposition of $Li_a(M)_b(PO_4)_c$ and the electrolyte, and reduces an increase in film formed at the interface.

(Contents of First Positive Electrode Active Material and Second Positive Electrode Active Material)

The contents of the first positive electrode active material and the second positive electrode active material can be measured using X-ray diffraction (XRD) measurement, inductively coupled plasma atomic emission spectrometry (ICP-AES) and the like. The respective contents can be measured as follows. First, the positive electrode active material layer 14 containing the first positive electrode active material and the second positive electrode active material is measured using XRD, and the first positive electrode active material and the second positive electrode active material are identified. Then, using ICP-AES and the like, the amounts of transition metal elements included in the positive electrode active material layer 14 are measured, and the measured amounts are converted in terms of the first positive electrode active material and the second positive electrode active material.

The positive electrode active material layer 14 contains the above-described first positive electrode active material and a conductive auxiliary agent. Examples of the conductive auxiliary agent include carbon materials such as carbon black; powders of metals such as copper, nickel, stainless, and iron; mixtures of carbon material and metal powder; and conductive oxides, such as ITO. The carbon material may include carbon with a tap density of 0.03 to 0.09 g/ml, and carbon with a tap density of 0.1 to 0.3 g/ml. The positive electrode active material layer 14 may include a binder for binding the first positive electrode active material and the conductive auxiliary agent. The positive electrode active material layer 14 may be formed by a step of coating the positive electrode current collector 12 with a paint including the $LiVOPO_4$ obtained by the manufacturing method according to the first embodiment, a binder, a solvent, and a conductive auxiliary agent.

When the positive electrode active material layer 14 contains a second positive electrode active material together with the first positive electrode active material and the conductive auxiliary agent, the second positive electrode active material may be additionally mixed in the paint in the above step.

When the second positive electrode active material is mixed in the paint, the first positive electrode active material and the second positive electrode active material may be dispersed and mixed before mixing the binder, solvent, and conductive auxiliary agent.

The method for dispersing and mixing the first positive electrode active material and the second positive electrode active material is not particularly limited, and a typically known method may be used. Examples of the method include a dry mixing using a pot mill in which zirconia balls or alumina balls are placed; dry mixing using an automated mortar; and mixing using a fluidized-bed device.

(Electrolyte)

The electrolyte of the lithium ion secondary battery 100 according to the present embodiment may contain 4-fluoroethylene carbonate (FEC). The amount of FEC added may be 0.1 to 35 weight % with respect to the entire electrolyte. In this case, the lithium ion secondary battery 100 can be rapidly charged at low temperature.

As the electrolyte for the present embodiment, lithium salt serving as a solute dissolved in nonaqueous solvent (organic solvent) is used. Examples of the lithium salt that may be used include salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. The salts may be used individually or in combination of two or more thereof.

The organic solvent may be propylene carbonate, ethylene carbonate, diethyl carbonate, dimethyl carbonate, or methyl ethyl carbonate. The organic solvents may be used individually or in a mixture of two or more of the organic solvents mixed at an arbitrary ratio. In order to stabilize the fluorine compound in the positive electrode active material layer 14, a fluorine-containing compound may be contained in the electrolyte.

In the present embodiment, the electrolyte may not be in liquid form. The electrolyte may be a gel electrolyte obtained by adding a gelation agent into liquid electrolyte. Instead of the electrolyte, a solid electrolyte (electrolyte containing a solid polymer electrolyte or an ionically conductive inorganic material) may be contained.

(Negative Electrode Active Material)

Examples of the negative electrode active material include carbon materials such as natural graphite, artificial graphite, hard carbon, soft carbon, and low temperature heat-treated carbon; metals or alloys that include Al, Si, Sn, Si and the like and that can be combined with lithium; amorphous compounds mainly composed of an oxide, such as $SiO_x(1<x\leq2)$ and $SnO_x(1<x\leq2)$; lithium titanate ($Li_4Ti_5O_{12}$); and $TiO_2$.

In the lithium ion secondary battery 100 according to the present embodiment, the negative electrode active material may contain at least one or more selected from silicon and silicon oxides, such as Si and $SiO_x(1<x\leq2)$. In this way, the charging characteristics of the battery at low temperatures can be further improved. This is believed to be because of the following reason. Decomposition of the surface of the positive electrode 10 containing $Li_a(M)_b(PO_4)_c$ by the electrolyte is reduced, and an increase in the film formed at the interface is reduced. Accordingly, migration of a decomposition product of the positive electrode 10 to the negative electrode 20 is reduced.

As the negative electrode active material included in the negative electrode active material layer 24, the above-described materials may be used. The negative electrode active material may be bound by the binder. The negative electrode active material layer 24, as in the case of the positive electrode active material layer 14, is formed by a step of coating the negative electrode current collector 22 with a paint including the negative electrode active material and the like.

(Separator)

The separator 18 can also be formed from a material that has an electrically insulating porous structure. Examples of the material include a single-layer body or a stacked body of polyethylene, polypropylene, or polyolefin films; an extended film of a mixture of the resins; and a fibrous nonwoven fabric including at least one configuration material selected from the group consisting of cellulose, polyester, and polypropylene.

(Case)

The case 50 seals the power generating element (stacked body) 30 and the electrolyte inside. The case 50 is not particularly limited and may be any article capable of reducing leakage of electrolyte to the outside, and the entry of moisture and the like into the lithium ion secondary battery 100 from the outside. For example, as the case 50, as illustrated in FIG. 1, a metal laminate film including a metal foil 52 and polymer films 54 coating both sides of the metal foil 52 can be utilized. For example, as the metal foil 52, an aluminum foil may be utilized, and as the polymer film (synthesis resin film) 54, a film of polypropylene and the like may be utilized. For example, the material of the outer polymer film 54 may be a polymer with a high melting point, such as polyethylene terephthalate (PET) or polyamide. The material of the inner polymer film 54 may be polyethylene, polypropylene, or the like.

The leads 60, 62 are formed from conductive material such as aluminum.

(Measurement of Amount of Gas Generated)

The gas generation rate in charged state of the lithium ion secondary battery 100 obtained as described above can be measured using an Archimedes method. Specifically, a cell is dipped in pure water to measure buoyancy, and the volume of the water displaced by the cell is calculated as the amount of gas generated.

Thus, the preferred embodiments of the lithium ion secondary battery according to the present disclosure have been described in detail. The technology of the present disclosure, however, is not limited to the embodiments.

EXAMPLES

In the following, the technology of the present disclosure will be described in more concrete terms with reference to examples and comparative examples. The technology of the present disclosure, however, is not limited to the following examples.

Example 1

Fabrication of Evaluation Cell $V_2O_5$, LiOH, and $H_3PO_4$ were put into a sealed container at a molar ratio of 1:2:2. These were heated at 160° C. for 8 hours in the sealed container, obtaining a paste. The obtained paste was heat-treated in the air at 600° C. for 4 hours. The particles obtained in this way were identified to be β-type $LiVOPO_4$.

The $LiVOPO_4$ particles, acetylene black (FX-35 from Denka Company Limited), and Ketjen black (EC600JD from Ketjen Black International Co., Ltd.) were weighed at a weight ratio of 80:5:5. The same was subjected to a mixing process using a planetary ball mill for 1 minute, and the process was repeated three times. The rotational speed of the planetary ball mill was set at 550 rpm.

The resultant mixture was mixed with a binder of polyvinylidene fluoride (PVDF, KF7305 from Kureha Corporation), and the mixture was then dispersed in a solvent of N-methyl-2-pyrrolidone (NMP), thereby preparing a slurry. The weight ratio of the mixture and PVDF in the slurry was adjusted to 90:10. Into the slurry, lithium fluoride was added to be 0.005 weight % with respect to the weight of the total of the first positive electrode active material, the binder, and a conductive auxiliary agent. The slurry was coated on an aluminum foil serving as a current collector. The aluminum foil with the slurry coated thereon was dried and then pressed. In this way, the positive electrode with the positive electrode active material layer formed thereon was fabricated.

Next, artificial graphite (FSN from BTR Inc.) as the negative electrode active material, and an N-methyl pyrrolidone (NMP) 5 wt % solution of polyvinylidene fluoride (PVdF) were mixed to a ratio of artificial graphite to polyvinylidene fluoride=93:7, thereby fabricating a slurry paint. The paint was coated on a copper foil as the current collector. The copper foil with the paint coated thereon was dried and pressed to fabricate the negative electrode.

The positive electrode and the negative electrode were stacked with the separator including a polyethylene microporous film interposed therebetween, thereby obtaining a stacked body (element body). The stacked body was put into an aluminum laminate pack. The electrolyte was fabricated as follows. Ethylene carbonate (EC) and diethyl carbonate (DEC) were mixed to a volume ratio of 3:7. Into the mixture solution, $LiPF_6$ as the supporting salt was dissolved at 1 mol/L. In this way, the electrolyte was obtained.

Into the aluminum laminate pack with the stacked body placed therein, the electrolyte was injected. The aluminum laminate pack was then vacuum-sealed. In this way, the evaluation cell of Example 1 was fabricated.

Examples 2 to 6, Comparative Example 3

The evaluation cells of Examples 2 to 6 and Comparative Example 3 were fabricated by the same method as in Example 1 with the exception that the amount of lithium fluoride added was varied.

Examples 7 to 12, Comparative Example 2

During cell fabrication, lithium fluoride was not added into the positive electrode, while 4-fluoroethylene carbonate was added into the electrolyte. Other than the above, the evaluation cells of Examples 7 to 12 and Comparative Example 2 were fabricated by the same method as in Example 1.

Example 13

The negative electrode was fabricated using the negative electrode active material that had 90 weight % of graphite and 10 weight % of silicon mixed therein. Other than the above, the evaluation cell of Example 13 was fabricated by the same method as in Example 9.

Examples 14 to 19

The negative electrode was fabricated using silicon as the negative electrode active material. Other than the above, the evaluation cells of Examples 14 to 19 were fabricated by the same method as in Examples 1 to 6.

Examples 20 to 25

The positive electrode was fabricated using $Li_3V_2(PO_4)_3$ as the first positive electrode active material. Other than the above, the evaluation cells of Examples 20 to 25 were fabricated by the same method as in Examples 7 to 12.

Example 26

The negative electrode was fabricated using the negative electrode active material that had 90 weight % of graphite and 10 weight % of silicon mixed therein. Other than the above, the evaluation cell of Example 26 was fabricated by the same method as in Example 24.

Example 27

The positive electrode was fabricated using $Li_{0.9}VOPO_4$ as the first positive electrode active material. Other than the above, the evaluation cell of Example 27 was fabricated by the same method as in Example 18.

Examples 28, 29

$LiVOPO_4$ was used as the first positive electrode active material, and $LiNi_{0.33}Mn_{0.33}Co_{0.33}O_2$ (noted as "NMC" in a table) as the second positive electrode active material. These were mixed at a mixture ratio of 7:3 or 3:7, thereby obtaining a mixture. Using the mixture, the positive electrode was fabricated. Other than the above, the evaluation cells of Examples 28, 29 were fabricated by the same method as in Example 9.

Example 30

$LiVOPO_4$ as the first positive electrode active material and $LiNi_{0.33}Mn_{0.33}Co_{0.33}O_2$ as the second positive electrode active material were mixed at a mixture ratio of 3:7, thereby obtaining a mixture. Using the mixture, the positive electrode was fabricated. Other than the above, the evaluation cell of Example 30 was fabricated by the same method as in Example 13.

Comparative Example 1

The evaluation cell of Comparative Example 1 was fabricated by the same method as in Example 1 with the exception that lithium fluoride was not added.

Comparative Example 4

The evaluation cell of Comparative Example 2 was fabricated by the same method as in Comparative Example 1 with the exception that lithium fluoride was added into the electrolyte.

Examples 31, 32 and Comparative Example 5

The evaluation cells of Examples 31, 32 and Comparative Example 5 were fabricated by the same method as in Example 14 with the exception that the amount of lithium fluoride added was modified.

Example 33, Comparative Example 6

The evaluation cells of Example 33 and Comparative Example 6 were fabricated by the same method as in Example 20 with the exception that the amount of FEC added was modified.

Examples 34 to 40, Comparative Examples 7, 8

The evaluation cells of Examples 34 to 40 and Comparative Examples 7, 8 were fabricated by the same method as in Example 29 with the exception that the amount of FEC added was modified.

(Measurement of Fluorine Compound-Present Region)

In the respective positive electrodes obtained by the methods of Examples 1 to 40 and Comparative Examples 1 to 8, elemental analysis by XPS was performed from the surface of the positive electrode active material layer. In this way, the presence or absence of fluorine compound in the depth direction from the surface of the positive electrode active material layer of each positive electrode was confirmed. A region from the surface of the positive electrode active material layer to a depth at which fluorine compound was detected was considered the fluorine compound-present region. The absence of detection of fluorine compound is indicated by N.D. (Not Detected).

(Measurement of Fluorine Content)

In the respective positive electrodes obtained by the methods of Examples 1 to 40 and Comparative Examples 1 to 8, the fluorine content in the positive electrode active material layer was measured by ion chromatography.

(Measurement of Rapid Charging Characteristics at Low Temperatures)

At 0° C., a current equivalent to 2 C with respect to battery capacity was caused to flow, and the time for completion of the charging was measured. The charging was conducted by constant current constant voltage charging (CCCV charging). When the current value reached 1/20 C of battery capacity, the charging was terminated. That is, the current value of 1/20 C of battery capacity being reached was the termination condition. The time before the termination condition was reached from charge start was evaluated as the charge time. In this measurement, with regard to current density, 1 C was 160 mAh/g. The charge voltage was 4.2 V (vs. Li/Li$^+$).

The rapid charging/discharging characteristics of evaluation cells fabricated by the methods of Examples 1 to 40 and Comparative Examples 1 to 8 were measured under the above condition. Specifically, the charge time of the evaluation cells was measured (evaluated) 5 times under the condition. In addition, an average value of the measurement results was calculated. The average value (average value of the results obtained when evaluated for n=5) was considered the rapid charging/discharging characteristics of each evaluation cell.

(Measurement of Amount of Gas Generated)

After the rapid charging characteristics at low temperatures of the evaluation cells of Examples 1 to 40 and Comparative Examples 1 to 8 were measured, the evaluation cells were discharged by constant-current discharge (CV discharge). The discharge voltage was 3.0 V (vs. Li/Li$^+$), and current density was equivalent to 0.5 C. After discharge, the amount of gas generated in the evaluation cells was measured by Archimedes method.

Table 1 below shows the results obtained by the above measurement with respect to Examples 1 to 40 and Comparative Examples 1 to 8.

TABLE 1

| | Positive electrode active material | Negative electrode active material | Fluorine source | Fluorine compound-present region (nm) | Fluorine source added amount (wt %) | Fluorine content in positive electrode (ppm) | Gas generation rate (%) | Charge time (min) |
|---|---|---|---|---|---|---|---|---|
| Example 1 | LiVOPO$_4$ | Graphite | LiF | 1 | 0.005 | 1 | 19.5 | 235 |
| Example 2 | LiVOPO$_4$ | Graphite | LiF | 13 | 0.007 | 49 | 16.5 | 201 |
| Example 3 | LiVOPO$_4$ | Graphite | LiF | 21 | 0.015 | 105 | 15.1 | 198 |
| Example 4 | LiVOPO$_4$ | Graphite | LiF | 38 | 0.017 | 138 | 14.4 | 203 |
| Example 5 | LiVOPO$_4$ | Graphite | LiF | 58 | 0.025 | 204 | 10.9 | 214 |
| Example 6 | LiVOPO$_4$ | Graphite | LiF | 86 | 0.035 | 300 | 22.6 | 233 |
| Example 7 | LiVOPO$_4$ | Graphite | FEC | 3 | 0.2 | 10 | 18.5 | 209 |
| Example 8 | LiVOPO$_4$ | Graphite | FEC | 16 | 1 | 84 | 15.9 | 196 |
| Example 9 | LiVOPO$_4$ | Graphite | FEC | 28 | 5 | 144 | 13.9 | 201 |
| Example 10 | LiVOPO$_4$ | Graphite | FEC | 46 | 10 | 225 | 18.3 | 211 |
| Example 11 | LiVOPO$_4$ | Graphite | FEC | 69 | 25 | 243 | 17.5 | 213 |
| Example 12 | LiVOPO$_4$ | Graphite | FEC | 100 | 33 | 276 | 21.3 | 228 |
| Example 13 | LiVOPO$_4$ | Graphite + Silicon | FEC | 27 | 5 | 99 | 9.5 | 183 |
| Example 14 | LiVOPO$_4$ | Silicon | LiF | 3 | 0.005 | 17 | 17.5 | 199 |
| Example 15 | LiVOPO$_4$ | Silicon | LiF | 15 | 0.007 | 51 | 13.4 | 191 |
| Example 16 | LiVOPO$_4$ | Silicon | LiF | 19 | 0.015 | 90 | 12.9 | 187 |
| Example 17 | LiVOPO$_4$ | Silicon | LiF | 41 | 0.017 | 135 | 10.7 | 189 |
| Example 18 | LiVOPO$_4$ | Silicon | LiF | 55 | 0.025 | 186 | 8.5 | 190 |
| Example 19 | LiVOPO$_4$ | Silicon | LiF | 80 | 0.035 | 270 | 16.3 | 211 |
| Example 20 | Li$_3$V$_2$(PO$_4$)$_3$ | Graphite | FEC | 5 | 0.2 | 19 | 17.9 | 212 |
| Example 21 | Li$_3$V$_2$(PO$_4$)$_3$ | Graphite | FEC | 29 | 1 | 96 | 17.2 | 214 |
| Example 22 | Li$_3$V$_2$(PO$_4$)$_3$ | Graphite | FEC | 38 | 5 | 168 | 17.0 | 211 |
| Example 23 | Li$_3$V$_2$(PO$_4$)$_3$ | Graphite | FEC | 49 | 10 | 183 | 15.8 | 209 |
| Example 24 | Li$_3$V$_2$(PO$_4$)$_3$ | Graphite | FEC | 65 | 25 | 228 | 20.8 | 224 |
| Example 25 | Li$_3$V$_2$(PO$_4$)$_3$ | Graphite | FEC | 98 | 33 | 288 | 23.1 | 237 |
| Example 26 | Li$_3$V$_2$(PO$_4$)$_3$ | Graphite + Silicon | FEC | 33 | 25 | 216 | 10.9 | 184 |
| Example 27 | Li$_{0.9}$VOPO$_4$ | Silicon | LiF | 65 | 0.025 | 243 | 12.8 | 208 |
| Example 28 | LiVOPO$_4$ + NMC | Graphite | FEC | 32 | 5 | 150 | 17.2 | 182 |
| Example 29 | LiVOPO$_4$ + NMC | Graphite | FEC | 36 | 5 | 174 | 13.9 | 183 |
| Example 30 | LiVOPO$_4$ + NMC | Graphite + Silicon | FEC | 26 | 5 | 132 | 8.8 | 31 |
| Comparative Example 1 | LiVOPO$_4$ | Graphite | None | 0 | 0 | N.D. | 31.5 | 268 |
| Comparative Example 2 | LiVOPO$_4$ | Graphite | FEC | 0 | 0.1 | 0.5 | 30.1 | 261 |
| Comparative Example 3 | LiVOPO$_4$ | Graphite | LiF | 122 | 0 | 350 | 28.7 | 265 |
| Comparative Example 4 | LiVOPO$_4$ | Graphite | None | 0 | 0 | N.D. | 32.3 | 264 |
| Example 31 | LiVOPO$_4$ | Silicon | LiF | 2 | 0.006 | 1 | 13.4 | 209 |
| Example 32 | LiVOPO$_4$ | Silicon | LiF | 33 | 25 | 221 | 14.9 | 203 |
| Comparative Example 5 | LiVOPO$_4$ | Silicon | LiF | 90 | 0.04 | 312 | 21.7 | 247 |
| Comparative Example 6 | Li$_3$V$_2$(PO$_4$)$_3$ | Graphite | FEC | 89 | 35 | 351 | 26.9 | 267 |
| Example 33 | Li$_3$V$_2$(PO$_4$)$_3$ | Graphite | FEC | 5 | 0.1 | 8 | 24.6 | 241 |
| Example 34 | LiVOPO$_4$ + NMC | Graphite | FEC | 29 | 4 | 108 | 12.3 | 179 |
| Example 35 | LiVOPO$_4$ + NMC | Graphite | FEC | 26 | 3 | 73 | 13.5 | 181 |
| Example 36 | LiVOPO$_4$ + NMC | Graphite | FEC | 20 | 1 | 20 | 13.1 | 180 |
| Example 37 | LiVOPO$_4$ + NMC | Graphite | FEC | 11 | 0.5 | 11 | 15.5 | 192 |
| Example 38 | LiVOPO$_4$ + NMC | Graphite | FEC | 2 | 0.1 | 2 | 18.2 | 203 |
| Example 39 | LiVOPO$_4$ + NMC | Graphite | FEC | 59 | 11 | 241 | 15.1 | 191 |
| Example 40 | LiVOPO$_4$ + NMC | Graphite | FEC | 68 | 14 | 295 | 17.9 | 213 |

TABLE 1-continued

|  | Positive electrode active material | Negative electrode active material | Fluorine source | Fluorine compound-present region (nm) | Fluorine source added amount (wt %) | Fluorine content in positive electrode (ppm) | Gas generation rate (%) | Charge time (min) |
|---|---|---|---|---|---|---|---|---|
| Comparative Example 7 | LiVOPO$_4$ + NMC | Graphite | FEC | 91 | 15 | 322 | 20.8 | 243 |
| Comparative Example 8 | LiVOPO$_4$ + NMC | Graphite | FEC | 0 | 0 | 0 | 21.0 | 239 |

From the results of Table 1, it is seen that in the evaluation cells according to the disclosed embodiments (Examples), the rapid charging/discharging characteristics at low temperature are improved. In addition, it is seen from the result of Comparative Example 4 that when fluorine compound was added in the electrolyte, the rapid charging/discharging characteristics at low temperature were not improved. This is believed to be because of the absence of fluorine compound in the positive electrode active material layer, as opposed to the case in which fluorine compound was added into the positive electrode active material layer.

Examples 41 to 48, Comparative Examples 9, 10

The evaluation cells of Examples 41 to 48 and Comparative Examples 9, 10 were fabricated by the same method as in Example 29, Examples 34 to 40, and Comparative Examples 6, 7 with the exception that LiNi$_{0.85}$Co$_{0.10}$Al$_{0.05}$O$_2$ (noted as "NCA" in the table) was used as the second positive electrode active material.

With respect to the evaluation cells fabricated by the methods of Examples 41 to 48 and Comparative Examples 9, 10, the fluorine compound-present region, the fluorine content, and the amount of gas generated in the evaluation cells after the measurement of the charging characteristics at low temperature were measured by the same method as in Example 1.

With respect to the evaluation cells fabricated by the methods of Examples 41 to 48 and Comparative Examples 9, 10, the rapid charging/discharging characteristics were measured by the same method as in Example 1. Specifically, the charge time of the evaluation cells was measured (evaluated) 5 times under the same condition as in Example 1. In addition, an average value of the measurement results was calculated. The average value (average value of the results evaluated for n=5) was considered the rapid charging/discharging characteristics of each evaluation cell.

Table 2 shows the results obtained by the above measurement with respect to Examples 41 to 48 and Comparative Examples 9, 10.

TABLE 2

|  | Positive electrode active material | Negative electrode active material | Fluorine source | Fluorine compound-present region (nm) | Fluorine source added amount (wt %) | Fluorine content in positive electrode (ppm) | Gas generation rate (%) | Charge time (min) |
|---|---|---|---|---|---|---|---|---|
| Example 41 | LiVOPO$_4$ + NCA | Graphite | FEC | 36 | 5 | 166 | 14.1 | 181 |
| Example 42 | LiVOPO$_4$ + NCA | Graphite | FEC | 29 | 4 | 105 | 13.1 | 180 |
| Example 43 | LiVOPO$_4$ + NCA | Graphite | FEC | 26 | 3 | 64 | 14.0 | 179 |
| Example 44 | LiVOPO$_4$ + NCA | Graphite | FEC | 20 | 1 | 19 | 13.6 | 181 |
| Example 45 | LiVOPO$_4$ + NCA | Graphite | FEC | 11 | 0.5 | 12 | 16.0 | 192 |
| Example 46 | LiVOPO$_4$ + NCA | Graphite | FEC | 2 | 0.1 | 4 | 18.4 | 201 |
| Example 47 | LiVOPO$_4$ + NCA | Graphite | FEC | 59 | 11 | 237 | 15.3 | 189 |
| Example 48 | LiVOPO$_4$ + NCA | Graphite | FEC | 68 | 14 | 289 | 18.1 | 213 |
| Comparative Example 9 | LiVOPO$_4$ + NCA | Graphite | FEC | 91 | 15 | 317 | 21.4 | 241 |
| Comparative Example 10 | LiVOPO$_4$ + NCA | Graphite | FEC | 0 | 0 | 0 | 22.1 | 240 |

From the results of Table 2, it was confirmed that even when the second positive electrode active material was modified, the rapid charging characteristics at low temperatures were similarly improved.

Examples 49 to 57

The evaluation cells of Examples 49 to 57 were fabricated by the same method as in Example 41 with the exception that the content of the first positive electrode active material with respect to the sum of the first positive electrode active material and the second positive electrode active material (hereafter referred to as "the content of the first positive electrode active material") was modified.

(Measurement of Initial Discharge Capacity)

During the measurement of initial discharge capacity, after the rapid charging characteristics at low temperatures were measured, the evaluation cells were discharged by constant-current discharge (CV discharge). The discharge voltage was 3.0 V (vs. Li/Li$^+$), and the current density was equivalent to 0.5 C. The capacity obtained in this case was divided by the total weight of the respective first positive electrode active material and second positive electrode active material, and the obtained value was considered the initial charge capacity (mAh g$^{-1}$) of the positive electrode. In this measurement, with regard to current density, 1 C was 160 mAh/g.

By charging and discharge the evaluation cells of Examples 49 to 57 and Example 41 under the above condition, the initial discharge capacity of each evaluation cell was measured. Specifically, the initial discharge capacity of the evaluation cells was measured (evaluated) 5 times. In addition, an average value of the measurement results was calculated. The average value (average value of the results evaluated for n=5) was considered the initial discharge capacity of each evaluation cell.

The rapid charging/discharging characteristics and the amount of gas generated of the evaluation cells fabricated by the methods of Examples 49 to 57 were measured by the same method as in Example 1.

Table 3 below shows the results obtained by the measurement with respect to Examples 49 to 57.

TABLE 3

|  | Content of positive electrode active material (wt %) | Gas generation rate (%) | Charge time (min) | Initial discharge capacity (mAh g$^{-1}$) |
| --- | --- | --- | --- | --- |
| Example 41 | 30 | 14.1 | 180 | 175 |
| Example 49 | 50 | 14.3 | 181 | 160 |
| Example 50 | 25 | 14.3 | 179 | 178 |
| Example 51 | 20 | 14.5 | 179 | 181 |
| Example 52 | 18 | 14.5 | 180 | 183 |
| Example 53 | 15 | 14.3 | 176 | 185 |
| Example 54 | 10 | 14.5 | 177 | 186 |
| Example 55 | 6 | 14.6 | 175 | 188 |
| Example 56 | 3 | 15.1 | 178 | 184 |
| Example 57 | 1 | 15.5 | 180 | 179 |

It is seen from the results shown in Table 3 that, when the content of the first positive electrode active material is in a range of 1 wt % to 30 wt %, both rapid charging characteristics at low temperatures and high initial discharge capacity can be achieved.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
    a positive electrode including a positive electrode active material layer;
    a negative electrode; and
    an electrolyte, wherein
    the positive electrode active material layer contains $Li_a(M)_b(PO_4)_c$ (M=VO or V, $0.9 \leq a \leq 3.3$, $0.9 \leq b \leq 2.2$, $0.9 \leq c \leq 3.3$) as a first positive electrode active material, and additionally contains a fluorine compound of 1 to 300 ppm in terms of fluorine with respect to a weight of the positive electrode active material layer, and
    the fluorine compound is present only in a region from a surface to a depth of 100 nm of the positive electrode active material layer.

2. The lithium ion secondary battery according to claim 1, wherein
    the fluorine compound is lithium fluoride.

3. The lithium ion secondary battery according to claim 1, wherein
    the first positive electrode active material contains $LiVOPO_4$ or $Li_3V_2(PO_4)_3$.

4. The lithium ion secondary battery according to claim 1, wherein the positive electrode active material layer additionally contains $LiNi_xCo_yMn_zM_aO_2$ (x+y+z+a=1, $0 \leq x \leq 1$, $0 \leq y \leq 1$, $0 \leq z \leq 1$, and $0 \leq a \leq 1$, where M is one or more elements selected from Al, Mg, Nb, Ti, Cu, Zn, and Cr) as a second positive electrode active material.

5. The lithium ion secondary battery according to claim 4, wherein
    the positive electrode active material layer contains 1 to 30 wt % of the first positive electrode active material with respect to a sum of the first positive electrode active material and the second positive electrode active material.

6. The lithium ion secondary battery according to claim 1, comprising 4-fluoroethylene carbonate as the electrolyte.

7. The lithium ion secondary battery according to claim 1, wherein
    the negative electrode contains at least one or more selected from silicon and silicon oxide as a negative electrode active material.

* * * * *